(12) United States Patent
Lavrentiev et al.

(10) Patent No.: US 11,755,447 B2
(45) Date of Patent: *Sep. 12, 2023

(54) PREDICTIVE PERFORMANCE INDICATOR FOR STORAGE DEVICES

(71) Applicant: Western Digital Technologies, Inc., San Jose, CA (US)

(72) Inventors: Michael Lavrentiev, Milpitas, CA (US); Narendhiran Chinnaanangur Ravimohan, Bangalore (IN); Meenakshi C, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/941,573

(22) Filed: Sep. 9, 2022

(65) Prior Publication Data
US 2023/0004472 A1   Jan. 5, 2023

Related U.S. Application Data

(63) Continuation of application No. 17/182,574, filed on Feb. 23, 2021, now Pat. No. 11,467,942.

(60) Provisional application No. 63/126,234, filed on Dec. 16, 2020.

(51) Int. Cl.
*G06F 11/34* (2006.01)
*G06F 9/445* (2018.01)
*G06N 5/04* (2023.01)
*G06N 5/02* (2023.01)
*G06N 7/01* (2023.01)

(52) U.S. Cl.
CPC ...... *G06F 11/3409* (2013.01); *G06F 9/44505* (2013.01); *G06N 5/02* (2013.01); *G06N 5/04* (2013.01); *G06N 7/01* (2023.01)

(58) Field of Classification Search
CPC .... G06F 11/3409; G06F 9/44505; G06N 7/01
See application file for complete search history.

(56) References Cited

U.S. PATENT DOCUMENTS

| 6,460,151 | B1  |    | 10/2002 | Warwick et al.             |
|-----------|-----|----|---------|----------------------------|
| 8,626,986 | B2  |    | 1/2014  | Wu et al.                  |
| 8,892,813 | B2  |    | 11/2014 | Kannappan et al.           |
| 9,460,389 | B1  |    | 10/2016 | Botelho et al.             |
| 11,126,682| B1  | *  | 9/2021  | Silverstein ...... G06F 16/4393 |
| 11,467,942| B2  | *  | 10/2022 | Lavrentiev ...... G06F 11/3447 |

(Continued)

OTHER PUBLICATIONS

Lin et al., "Efficient and Intelligent Garbage Collection Policy for NAND Flash-based Consumer Electronics," IEEE Transactions on Consumer Electronics, vol. 59, No. 3, Aug. 2013, pp. 538-543.

*Primary Examiner* — Henry Tsai
*Assistant Examiner* — John B Roche
(74) *Attorney, Agent, or Firm* — PATENT LAW WORKS LLP

(57) ABSTRACT

Systems and methods for predictive performance indicators for storage devices are described. The data storage device may process host storage operations and maintenance operations that impact real-time performance. A performance value and corresponding threshold may be determined. Increases in maintenance operations and resulting changes in the performance value may be predicted. When the predicted change in performance value crosses the performance threshold, the host device may be notified.

20 Claims, 7 Drawing Sheets

(56) References Cited

U.S. PATENT DOCUMENTS

| | | |
|---|---|---|
| 11,507,502 B2 * | 11/2022 | Ravimohan ......... G06F 11/3034 |
| 2014/0032817 A1 | 1/2014 | Bux et al. |
| 2017/0177217 A1 | 6/2017 | Kanno |
| 2017/0177218 A1 | 6/2017 | Kanno |
| 2019/0121350 A1 * | 4/2019 | Celia .................... H04B 17/345 |
| 2019/0121728 A1 | 4/2019 | Jung et al. |
| 2019/0179747 A1 | 6/2019 | Kim |
| 2019/0324439 A1 | 10/2019 | Cella et al. |
| 2020/0042438 A1 | 2/2020 | Yi et al. |
| 2020/0097403 A1 | 3/2020 | Saxena et al. |
| 2020/0132815 A1 | 4/2020 | Nguyen et al. |
| 2020/0133845 A1 | 4/2020 | Kim et al. |
| 2020/0183753 A1 * | 6/2020 | Kumar .................. G06F 9/5088 |
| 2020/0183851 A1 | 6/2020 | Um |
| 2020/0310956 A1 | 10/2020 | Kim et al. |
| 2021/0240613 A1 | 8/2021 | Na |
| 2021/0253394 A1 * | 8/2021 | Kokkala ............. G05B 13/042 |
| 2021/0278990 A1 | 9/2021 | Choi |
| 2021/0319491 A1 * | 10/2021 | Kushch .............. G06Q 30/0631 |

* cited by examiner

PREDICTIVE PERFORMANCE INDICATOR FOR STORAGE DEVICES

TECHNICAL FIELD

The present disclosure generally relates to storage device performance indicators and, more particularly, to host interfaces for predictive input/output performance indicators.

BACKGROUND

Data storage devices, such as disk drives (solid-state drives, hard disk drives, hybrid drives, tape drives, etc.), universal serial bus (USB) flash drives, secure digital (SD) cards and SD extended capacity (SDXC) cards, and other form factors, may be used for storing data on behalf of a host, host system, or host device. These storage devices may include integrated storage devices built into the enclosure of the host device, removable storage devices mating with the host device through a physical interface connector (directly or through an interface cable), and network storage devices communicating with the host device using network protocols over a wired or wireless network connection. Some removable storage devices and/or network storage devices may use short range wireless communication, such as Bluetooth, ultra-wideband (UWB), Wi-Fi, Zigbee, etc., for communication with a host device or network. Storage devices may be integrated into storage systems that vary from single storage devices directly supporting a host device through a peripheral storage interface to multi-device storage systems (often supporting multiple host systems) that include multiple storage devices arranged in an array of drives interconnected by a common communication fabric and, in many cases, controlled by a storage controller, redundant array of independent disks (RAID) controller, or general controller, for coordinating storage and system activities across the array of drives.

Data storage devices generally include a storage capacity rating that tells users and/or host devices the expected storage capacity of the storage device and may further communicate actual, used, and available capacity parameters to the host. For some systems and applications, storage devices may support defined performance ratings, generally measured by input/output (I/O) operations per second (IOPS) and/or megabytes per second (MB/s), and may provide quality of service (QoS) ratings for specific workload types, such as sequential writes, random writes, sequential reads, and random reads. Some host devices may be designed and/or configured to utilize storage devices that include performance and/or QoS ratings and expect storage devices to deliver the performance and/or QoS parameters during operation. For example, a storage device that cannot maintain the performance requirements to offload host data may cause buffer overflows or other errors.

Some data storage devices may require background maintenance operations, such as garbage collection, to maintain storage capacity and performance over time. While some storage devices may be able to use idle time to complete maintenance operations, removable storage devices, such as SD cards, may be powered down or removed when not in active use for storage operations and may not be provided with adequate idle time to complete maintenance operations in the background. As a result, background maintenance operations may compete with foreground storage operations during runtime for storage controller processors, memory channels, encoders, and other processing resources. Early in the life of a storage device and/or under relatively low loads, low-level maintenance operations can be performed in parallel with storage operations. However, if a storage device is used at or close to its performance limits for extended periods and as free capacity decreases, the volume of maintenance operations necessary to recover deleted and/or redundant data, enforce wear leveling, and/or perform other maintenance operations may become a noticeable burden on the processing resources of the storage device and reduce its capability to meet the performance requirements of the host. If this occurs suddenly, it may cause undesirable host errors, such as buffer overflows and application crashes, and/or unacceptably decreased performance for the user of the host device.

A predictive performance indicator for data storage devices that warns the host device of an impending change in performance may be advantageous. An effective interface for configuring the performance prediction parameters and providing the notification to the host device may be needed.

SUMMARY

Various aspects for data storage device performance prediction, particularly a host interface for host configuration and predicted performance change indicators based on maintenance operations, are described.

One general aspect includes a system that includes a data storage device including a storage medium configured to store host data and a storage device controller, including processing resources, configured to: process, using the storage medium and the processing resources, storage operations from a host device; process, using the storage medium and the processing resources, maintenance operations for increasing storage availability in the storage medium; determine a performance value for the storage operations; predict an increase in maintenance operations; predict, based on the predicted increase in maintenance operations, a change in the performance value; and notify, through a host interface, the host device of the predicted change in the performance value.

Implementations may include one or more of the following features. The performance value may be selected from: an input/output operations per unit time value, a data volume per unit time value, and a nominal performance value for the data storage device. The storage device controller may be further configured to: determine a performance threshold for the performance value, and determine that the change in the performance value crosses the performance threshold, where notifying the host device of the predicted change in the performance value is responsive to determining that the change in the performance value crosses the performance threshold. The storage device controller may be further configured to: receive, through the host interface, a host performance window value; determine, based on the host performance window value, a performance window; and predict the increase in the maintenance operations over the performance window. The storage device controller may be further configured to: receive, through the host interface, a host prediction horizon value; determine, based on the host prediction horizon value, a prediction horizon; and predict the increase in maintenance operations at a future time corresponding to the prediction horizon. The storage device controller may be further configured to: determine a plurality of severity thresholds; determine, based on the predicted change in the performance value and the plurality of severity thresholds, a severity value for the predicted change; and report, through the host interface, the severity value for the predicted change. The storage device controller may be further configured to: determine a prediction probability value for the predicted change in the performance value; and report, through the host interface, the prediction probability value for the predicted change. The host interface may include a notification register and the host device may be configured to: periodically check the notification register; and receive, from the data storage device and responsive to checking the notification register, notification of the predicted change in the performance value. The host interface may include an interface function register that may include a plurality of memory locations and the storage device controller may be further configured to store, responsive to the predicted change in the performance value, at least one performance change indicator value in an indicator memory location of the plurality of memory locations in the interface function register. The system may include the host device including: a host processor; a host memory: a storage interface configured to communicate with the host interface of the data storage device; and a storage manager. The storage manager may be configured to: send storage operations to the storage device according to a defined host access pattern and a storage performance requirement; receive, from the storage device, notification of the predicted change in the performance value; and display, to a user of the host device, a warning notification indicating the predicted change in the performance value. The data storage device may include a removable storage device configured to be removably attached to the host device and the host device may be configured to initialize the data storage device. The storage manager may be further configured to: establish, responsive to initializing the data storage device, a performance interface with the data storage device; and set, through the performance interface, at least one performance monitoring parameter selected from a performance value type, a host performance threshold value, a host performance window value, a host prediction horizon value, a notification type, and a reporting interval. The storage device controller may be further configured to: determine, responsive to the data storage device being initialized and based on a plurality of storage operations from the host, the defined host access pattern; and predict the increase in maintenance operations based on the defined host access pattern continuing through a performance window. The maintenance operations for increasing storage availability may include garbage collection of flash memory data blocks.

Another general aspect includes a computer-implemented method including: processing, by a data storage device, storage operations from a host device; processing, by the data storage device, maintenance operations for increasing storage availability in a storage medium in the storage device; determining, by the data storage device, a performance value for the storage operations; predicting, by the data storage device, an increase in maintenance operations; predicting, by the data storage device and based on the predicted increase in maintenance operations, a change in the performance value; and notifying, by the data storage device and through a host interface, the host device of the predicted change in the performance value.

Implementations may include one or more of the following features. The computer-implemented method may further include: determining, by the data storage device, a performance threshold for the performance value; and determining, by the data storage device, that the change in the performance value crosses the performance threshold, where notifying the host device of the predicted change in the performance value is responsive to determining that the change in the performance value crosses the performance threshold. The computer-implemented method may include: receiving, by the data storage device and through the host interface, a host performance window value; determining, by the data storage device and based on the host performance window value, a performance window; and predicting, by the data storage device, the increase in maintenance operations over the performance window. The computer-implemented method may include: receiving, by the data storage device and through the host interface, a host prediction horizon value; determining, by the data storage device and based on the host prediction horizon value, a prediction horizon; and predicting, by the data storage device, the increase in maintenance operations at a future time corresponding to the prediction horizon. The computer-implemented method may include: determining, by the data storage device, a plurality of severity thresholds; determining, by the data storage device and based on the predicted change in the performance value and the plurality of severity thresholds, a severity value for the predicted change; and reporting, by the data storage device and through the host interface, the severity value for the predicted change. The computer-implemented method may include: determining, by the data storage device, a prediction probability value for the predicted change in the performance value; and reporting, by the data storage device and through the host interface, the prediction probability value for the predicted change. The computer-implemented method may include: storing, by the data storage device, a notification value in a notification register of the host interface; periodically checking, by the host device, the notification register; and receiving, by the host device and responsive to checking the notification register, notification of the predicted change in the performance value. The computer-implemented method may include storing, by the data storage device and responsive to the predicted change in the performance value, at least one performance change indicator value in an indicator memory location, wherein the indicator memory location is in an interface function register in the host interface. The computer-implemented method may include: sending, by the host device, storage operations to the data storage device according to a defined host access pattern and a storage performance requirement; receiving, by the host device and from the data storage device, notification of the predicted change in the performance value; and displaying, by the host device and to a user of the host device, a warning notification indicating the predicted change in the performance value.

Still another general aspect includes a data storage device that includes: a storage medium configured to store host data; a storage device controller, including: a processor, an operating memory, and a host interface configured for communication with a host device; means for processing storage operations from the host device; means for processing maintenance operations for increasing storage availability in a storage medium in the storage device; means for determining a performance value for the storage operations; means for determining a performance threshold for the performance value; means for predicting an increase in maintenance operations; means for predicting, based on the predicted increase in maintenance operations, a change in the performance value that crosses the performance threshold; and means for notifying, through the host interface, the host device of the predicted change in the performance value.

The various embodiments advantageously apply the teachings of data storage devices and/or storage systems to improve the functionality of such computer systems. The various embodiments include operations to overcome or at least reduce the issues previously encountered in storage systems and, accordingly, are more configurable and/or reliable than other computing systems. That is, the various embodiments disclosed herein include hardware and/or software with functionality to improve the data storage device performance prediction, such as by the data storage device using a host interface for predicted performance changes indicators based on maintenance operations. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
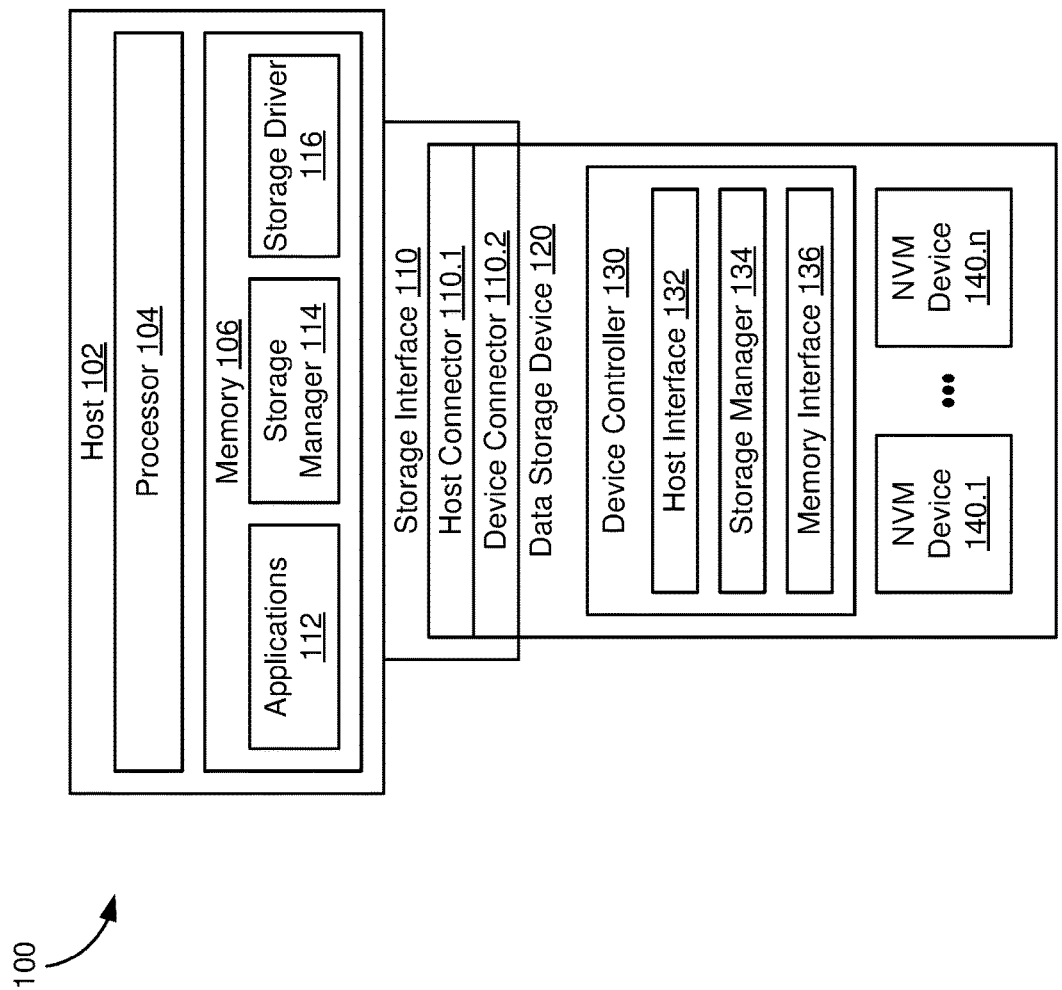
FIG. 1 schematically illustrates a storage system with host device and a data storage device.

FIG. 1 shows an embodiment of an example data storage system 100 with a data storage device 120 interconnected by a storage interface 110 to host device 102. While some example features are illustrated, various other features have not been illustrated for the sake of brevity and so as not to obscure pertinent aspects of the example embodiments disclosed herein. To that end, as a non-limiting example, data storage system 100 includes one or more data storage devices 120 (also sometimes called information storage devices, disk drives, or drives) in communication with one or more host devices 102. In some embodiments, host device 102 may be a user device with an embedded computing system, such as video camera, mobile phone, tablet computer, smart television, smart appliance, portable game device, printer, or other consumer electronic device. In some embodiments, storage device 120 may be a removable storage device, such as a universal serial bus (USB) flash drive, secure digital (SD) card, extended capacity (SDXC) SD card, or other removable storage device.

In some embodiments, storage device 120 may be configured in a server or storage array blade or similar storage unit for use in data center storage racks or chassis. Storage device 120 may interface with one or more host devices 102 and provide data storage and retrieval capabilities for or through those host systems. In some embodiments, host device 102 may support one or more client systems or devices configured to access data in or about storage device 120. For example, clients may include one or more applications that access data from storage device 120 through host device 102 and/or through a network or network fabric.

In some embodiments, storage device 120 may be configured in a storage hierarchy that includes storage nodes, storage controllers, and/or other intermediate components between storage device 120 and host device 102. For example, each storage controller may be responsible for a corresponding set of storage nodes and their respective storage devices connected through a corresponding backplane network and/or network fabric, though only storage device 120 and host device 102 are shown.

In the embodiment shown, storage device 120 is attached to storage interface 110 for host communication with host device 102. For example, host device 102 may include a host connector 110.1, such as a peripheral component interface express (PCIe) connector, USB slot, memory card slot/reader (for Memory Stick, MultiMedia Card, SD, SDXC, etc. memory cards), etc., that provides a physical connector configured to mate with a corresponding storage device connector 110.2. In some embodiments, host connector 110.1 may define a slot or port providing a wired internal connection to a host bus or storage interface controller. In some embodiments, device connector 110.2 may include a portion of a storage device housing or projection therefrom that removably inserts into the slot or port in host connector 110.1 to provide a physical attachment and electrical connection for host-device communication. In some embodiments, an intervening wire, extender, switch, or similar device compatible with host connector 110.1 and device connector 110.2 may be inserted between host connector 110.1 and device connector 110.2 without materially changing the host-device interface or operation of storage interface 110.

In some embodiments, storage interface 110 may be configured to use network communication protocols. Host connector 110.1 and device connector 110.2 may include any type of physical connector compatible with one or more network and/or internet protocols. For example, host connector 110.1 and device connector 110.2 may include ethernet, PCIe, Fibre Channel, small computer serial interface (SCSI), serial attached SCSI (SAS), or another network-capable interface. In some embodiments, storage device 120 may communicate through a backplane network, network switch(es), and/or other hardware and software components accessed through storage interface 110 for reaching host device 102. For example, storage interface 110 may include or interconnect with a plurality of physical port connections and intermediate components that define physical, transport, and other logical channels for establishing communication with the different components and subcomponents for establishing a communication channel between host device 102 and storage device 120. In some embodiments, storage interface 110 may provide a primary host interface for storage device management and host data transfer, as well as a control interface that includes limited connectivity to the host for low-level control functions, such as through a baseboard management controller (BMC).

In some embodiments, data storage device 120 is, or includes, a solid-state memory device. Data storage device may include a non-volatile memory (NVM) or storage device controller 130 based on compute resources (processor and memory) and a plurality of NVM or media devices 140 for data storage (e.g., one or more NVM device(s), such as one or more flash memory devices). In some embodiments, storage device controller 130 may include a host interface controller 132, a host storage manager 134, and one or more memory interface controllers 136. For example, host interface controller 132 may include a physical subsystem, such as an application specific integrated circuit (ASIC) or system on a chip (SOC), and/or logic or firmware running on the general compute resources of storage device controller 130 for configuring and controlling communication with host device 102 over storage interface 110. Host storage manager 134 may include configuration, background, and storage processing operations running on the general compute resources of storage device controller 130 to coordinate operation of storage device 120, host interface 132, and memory interface 136. Memory interface 136 may include a physical memory bus and related resources for connecting to media devices 140.1-140.n, such as flash controllers or channel controllers (e.g., for storage devices having NVM devices in multiple memory channels). In some embodiments, data storage devices 120 may each be packaged in a housing, such as a multi-part sealed housing with a defined form factor and ports and/or connectors, such as device connector 110.2, for interconnecting with storage interface 110.

In some embodiments, data storage device 120 may include a single medium device while in other embodiments data storage device 120 includes a plurality of media devices. In some embodiments, media devices 140 may include NAND-type flash memory or NOR-type flash memory. In some embodiments, data storage device 120 may include one or more hard disk drives (HDDs). In some embodiments, data storage device 120 may include a flash memory device, which in turn includes one or more flash memory die, one or more flash memory packages, one or more flash memory channels, or the like. However, in some embodiments, data storage device 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, storage device 120 includes storage device controller 130, which includes one or more processing units (also sometimes called central processing units (CPUs), processors, microprocessors, or microcontrollers) configured to execute instructions in one or more programs. In some embodiments, the one or more processors are shared by one or more components within, and in some cases, beyond the function of the device controller. Media devices 140 may be coupled to device controller 130 through connections that typically convey commands in addition to data, and optionally convey metadata, error correction information and/or other information in addition to data values to be stored in media devices and data values read from media devices 140. Media devices 140 may include any number (i.e., one or more) of memory devices including, without limitation, non-volatile semiconductor memory devices, such as flash memory device(s).

In some embodiments, media devices 140 in storage device 120 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 120 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations in storage device 120, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks. In some configurations, logical and/or physical zones may be assigned within storage device 120 as groups of data blocks allocated for specified host data management purposes.

In some embodiments, host, host system, or host device 102 may be coupled to data storage system 100 through a network interface that is part of host fabric network that includes storage interface 110 as a host fabric interface. In some embodiments, multiple host devices 102 (only one of which is shown in FIG. 1) and/or clients are coupled to data storage system 100 through the fabric network, which may include a storage network interface or other interface capable of supporting communications with multiple host systems. In some embodiments, the fabric network may operate over a wired and/or wireless network (e.g., public and/or private computer networks in any number and/or configuration) which may be coupled in a suitable way for transferring data. For example, the network may include any means of a conventional data communication network such as a local area network (LAN), a wide area network (WAN), a telephone network, such as the public switched telephone network (PSTN), an intranet, the internet, or any other suitable communication network or combination of communication networks.

Host device 102 may be any suitable computer device, such as a computer, a computer server, a laptop computer, a tablet device, a netbook, an internet kiosk, a personal digital assistant, a mobile phone, a smart phone, a gaming device, a smart appliance, a camera or video camera, consumer electronics device, or any other computing device. Host device 102 is sometimes called a host, client, or client system, depending on respective roles, configurations, and contexts. In some embodiments, host device 102 is distinct from a storage controller, storage node, or storage interface component housing or receiving storage device 120. In some embodiments, host device 102 may be any computing device configured to store and access data in storage device 120.

Host device 102 may include one or more central processing units (CPUs) or processors 104 for executing compute operations or instructions for accessing storage devices 120 through storage interface 110. In some embodiments, processor 104 may be associated with operating memory 106 for executing both storage operations and a storage interface protocol compatible with storage interface 110 and storage device 120. In some embodiments, a separate storage interface unit (not shown) may provide the storage interface protocol and related processor and memory resources. From the perspective of storage device 120, storage interface 110 may be referred to as a host interface and provides a host data path between storage device 120 and host device 102.

Host device 102 may include memory 106 configured to support various data access and management functions, generally in support of one or more applications 112. Memory 106 may include a random access memory (RAM) or another type of dynamic storage device that stores information and instructions for execution by processor 104 and/or a read only memory (ROM) or another type of static storage device that stores static information and instructions for use by processor 104 and/or any suitable storage element such as a hard disk or a solid state storage element. For example, memory 106 may include one or more dynamic random access memory (DRAM) devices for use by host device 102 for command, management parameter, and/or host data storage and transfer to and from storage device 120. In some embodiments, storage devices 120 may be configured for direct memory access (DMA), such as using remote direct memory access (RDMA) protocols, over storage interface 110 to interact with host device 102.

In some embodiments, host device 102 may include one or more applications 112 instantiated in host memory 106 for execution by host processor 104. Applications 112 may include and/or be configured to access one or more storage management functions of storage manager 114. Storage manager 114 may include applications, services, libraries, and/or corresponding interfaces for managing the contents and operation of storage device 120 on behalf of host device 102. For example, storage manager 114 may include services for monitoring storage device parameters, such as total capacity, capacity used, and capacity available, tracking storage device I/O history, performance, and workload, and initiating host storage maintenance functions, such as media scans, defragmentation, host data transfer or reorganization, etc. In some embodiments, storage manager 114 may configure and monitor storage device alerts and notifications for performance monitoring. For example, storage manager 114 may include a function for monitoring for predictive performance change notifications or indicators from storage device 120 and logic for responding to such notifications or indicators. Storage manager 114 may include and/or be configured to access a storage driver 116 configured to manage communications with storage device 120 in accordance with a defined storage protocol supported by storage interface 110 and host and storage device configuration parameters. In some embodiments, storage driver 116 may be an operating system and/or firmware service or set of services configured to initialize, control, and manage communication through storage interface 110 to storage device 120.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

Figure 2:
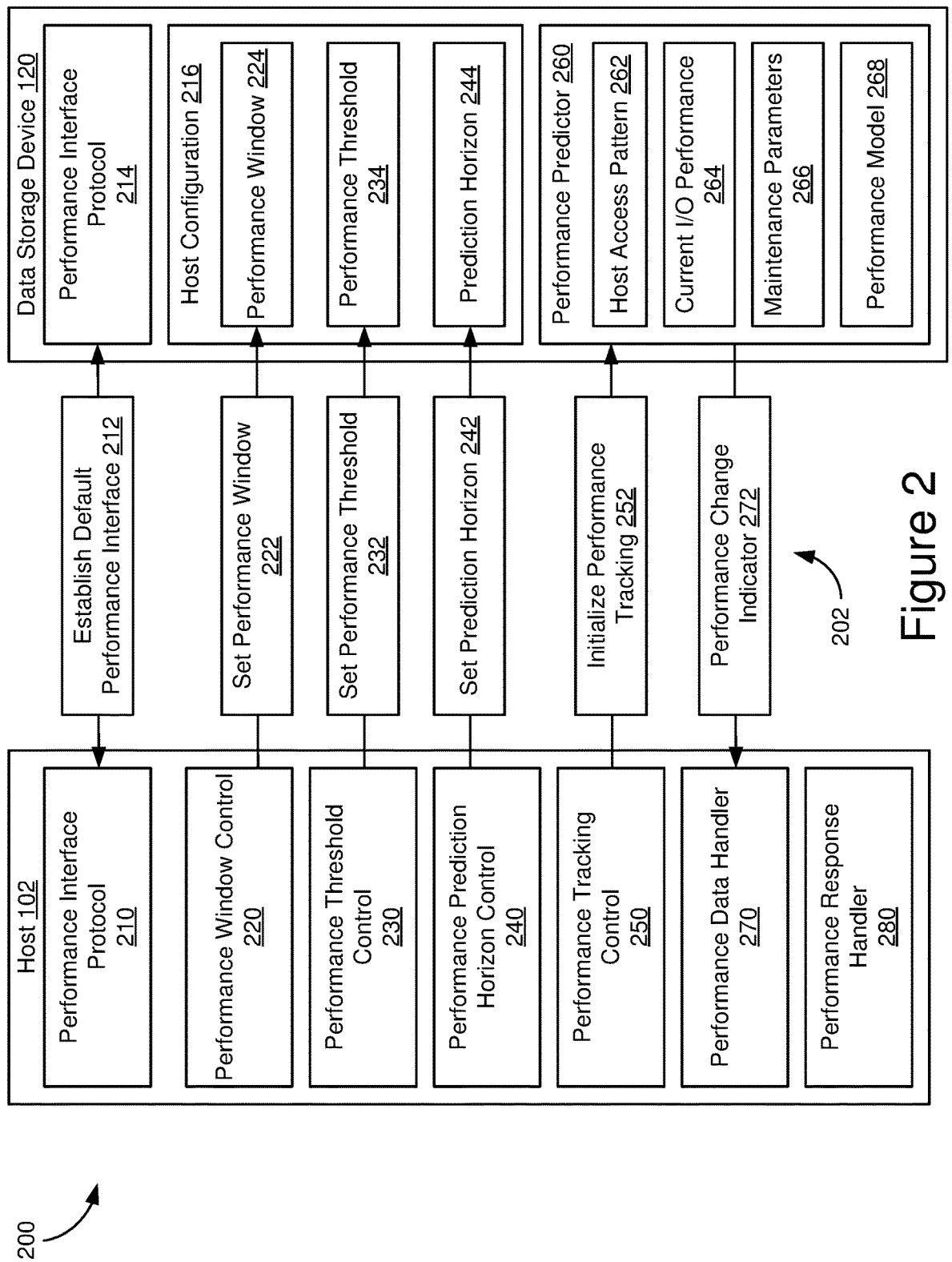
FIG. 2 schematically illustrates an interface for predictive performance change indicators that may be used by the storage system of FIG. 1.

FIG. 2 shows a schematic representation of a host/storage interface for predictive performance change indicators that may be used by a storage system 200 configured similarly to storage system 100 of FIG. 1. Host device 102 may be configured for communication with storage device 120, such as through a storage interface similar to storage interface 110 in FIG. 1. In some embodiments, communications 202 may include messages passed between host device 102 and storage device 120. For example, host device 102 and storage device 120 may support bi-directional packetized communication using a master-slave or multi-master configuration over a communication bus or network connection between them. In some embodiments, communications 202 between host 102 and storage device 120 may include register-based communication controlled solely by host device 102. For example, the interface between storage device 120 and host device 102 may define a set of memory locations in storage device 120 that are accessible to host device 102, such as a function register of an SD card interface or a command buffer configured for RDMA access. Host device 102 may read storage device memory locations to receive feature support information and performance indicators and write to storage device memory locations to set configuration parameters.

Host device 102 and storage device 120 may include performance interface protocols 210, 214 that support a compatible set of functions and parameters within the larger storage interface protocol used for communication between the devices. In some embodiments, performance interface protocols 210, 214 may include a function or extension defined for an existing storage interface protocol. For example, performance interface protocols 210, 214 may include mutual support for an extended performance monitoring function for SD cards that uses an extension register for function definition, configuration parameters, and performance indicators, as well as using an existing event notification mechanism, such as a function status bit that indicates to host device 102 that the register should be read. Host device 102 and storage device 120 may establish a default performance interface 212. For example, host device 102 may establish the default performance interface by interrogating storage device 120 for a set of function features or parameters supported by storage device 120. Responsive to host device 102 determining that a compatible performance monitoring function is supported by storage device 120, host device 102 may read the default parameters provided by storage device 120 and determine whether one or more configuration parameters should be changed. In some embodiments, storage device 120 may include a set of default configuration parameters in performance interface protocol 214 and/or accept a set of host configuration parameters 216 that override some or all of the default configuration parameters.

Performance window control 220 may include host control of at least one performance window value to be used by storage device 120 in predicting performance changes. For example, host device 102 may change a default performance window to increase or decrease the data collection time window used to determine the host access pattern, processing resource usage, and maintenance parameter values for predicting future changes. In some embodiments, performance window control 220 may include one or more defined performance window values corresponding to one or more host commands or access patterns. Performance window control 220 may be configured to set a host performance window 222 in host configuration parameters 216. For example, performance window control 220 may write host performance window value 224 into one or more host configuration registers or memory locations and/or send a host configuration message that is parsed by storage device 120 to determine and store host performance window value 224 in host configuration parameters 216.

Performance threshold control 230 may include host control of at least one performance threshold value to be used by storage device 120 in predicting performance changes and determining notification or alert conditions. For example, host device 102 may change a default performance threshold to increase or decrease the required performance limit or limits used to determine whether and/or when a projected performance value for the host access pattern crosses the host threshold value(s) and a performance change indicator is provided by storage device 120. In some embodiments, performance threshold control 230 may include one or more defined performance threshold values corresponding to storage device processing requirements to prevent host application errors or degradation of host application performance. In some embodiments, performance thresholds may be based on specific performance threshold values or a percentage or other function based on a nominal performance value for storage device 120. Performance threshold control 230 may be configured to set a host performance threshold 232 in host configuration parameters 216. For example, performance threshold control 230 may write host performance threshold value 234 into one or more host configuration registers or memory locations and/or send a host configuration message that is parsed to by storage device 120 determine and store host performance threshold value 234 in host configuration parameters 216.

Performance prediction horizon control 240 may include host control of at least one performance prediction horizon value to be used by storage device 120 in predicting performance changes and determining notification or alert conditions. For example, host device 102 may change a default performance prediction horizon to increase or decrease how far in the future the current operating parameters should be extrapolated into the future for evaluating whether or not one or more performance thresholds are crossed and a performance change indicator should be provided by storage device 120. In some embodiments, performance prediction horizon control 240 may include one or more defined performance horizon control values corresponding to host command duration, use case durations, and/or prediction limits of the performance model being used. Performance prediction horizon control 240 may be configured to set a host performance prediction horizon 242 in host configuration parameters 216. For example, performance prediction horizon control 240 may write host performance prediction horizon value 244 into one or more host configuration registers or memory locations and/or send a host configuration message that is parsed by storage device 120 to determine and store host performance prediction horizon value 244 in host configuration parameters 216. In some embodiments, host device 102 may set any combination of host configuration parameters and performance window value 224, performance threshold value 234, and performance prediction horizon value 244 may be provided in FIG. 2 as a non-limiting example.

Performance tracking control 250 may enable host device 102 to initiate and/or restart predictive performance monitoring by storage device 120. For example, performance tracking control 250 may be configured to initiate performance tracking responsive to providing a set of host configuration parameters to storage device 120 and/or changes in host device storage operations, such as specific commands, modes, or use cases with distinct host access patterns and/or related host configuration parameters. In some embodiments, performance tracking control 250 may initialize performance tracking 252 to notify performance predictor 260 to start and/or restart performance monitoring based on the current configuration of host configuration parameters 216. For example, performance tracking control 250 may write an initialization or enablement flag or other value in a function initialization register or memory location and/or send a host initialization message that is parsed by storage device 120 as a performance monitor initialization command.

Performance predictor 260 may include interfaces, functions, parameters, and/or data structures that enable storage device 120 to monitor relevant parameters, calculate predicted performance values, and generate performance change indicators based on performance interface protocol 214, host configuration parameters 216, and operating parameters of storage device 120. For example, performance predictor 260 may be configured to access and aggregate operating parameters over a performance window and extrapolate continued operation to one or more prediction horizons to determine whether one or more performance thresholds are met or crossed. In some embodiments, performance predictor 260 may be configured to determine a host access pattern 262 over the performance window. For example, performance predictor 260 may compare host I/O patterns to one or more access pattern baseline values, such as sequential write, random write, sequential read, random read, and/or more complex patterns including combinations, sequences, and/or percentages of two or more base patterns. In some embodiments, performance predictor 260 may use current I/O performance and/or one or more I/O performance parameters monitored by the storage device as input values calculating predicted performance values. For example, performance predictor 260 may aggregate I/O parameters over the performance window to determine corresponding storage operation usage of processing resources. In some embodiments, performance predictor 260 may use maintenance parameters as input values for calculating predicted performance values. For example, performance predictor 260 may use garbage collection parameters, such as a valid fragment count of processed data blocks, percentage or total of invalid data stored (and needing garbage collection), write amplification factors, etc., to project increases in maintenance operations based on continuing the host access pattern to one or more prediction horizons. In some embodiments, performance predictor 260 may include a performance model 268 that correlates the current host access pattern 262, current I/O performance parameters 264, and maintenance parameters 266 to projected or predicted maintenance requirements, attendant changes in available processing resources, and resulting changes in host I/O performance. Performance predictor 260 may generate one or more performance change indicators 272 responsive to performance threshold values and notify host device 102 of the predicted performance change. For example, predicted performance values from performance model 268 may be compared to performance threshold values at intervals up to the prediction horizon to determine whether and what performance change indicator 272 is provided by storage device 120 to host device 102.

In some embodiments, host device 102 may include a performance data handler 270 configured to receive and/or access performance change indicator 272. For example, performance data handler 270 may monitor a notification register or memory location in storage device 120 on a periodic basis to determine the availability of new performance change indicators and/or receive and parse a notification message from storage device 120. In some embodiments, host device 102 may include a performance response handler configured to determine one or more host responses to performance change indicators determined by performance data handler 270. For example, performance response handler 280 may include one or more logical rules evaluated with regard to each performance change indicator received to determine further action by host devices 102. In some embodiments, performance response handler 280 may map selected performance change indicators meeting specified binary thresholds, severity thresholds, prediction probabilities, and/or prediction times to predetermined response actions, such as providing user notifications or warning indicators to a user interface, throttling I/O commands, adjusting buffer management, enabling a graceful exit from a threatened application, etc.

Figure 3:
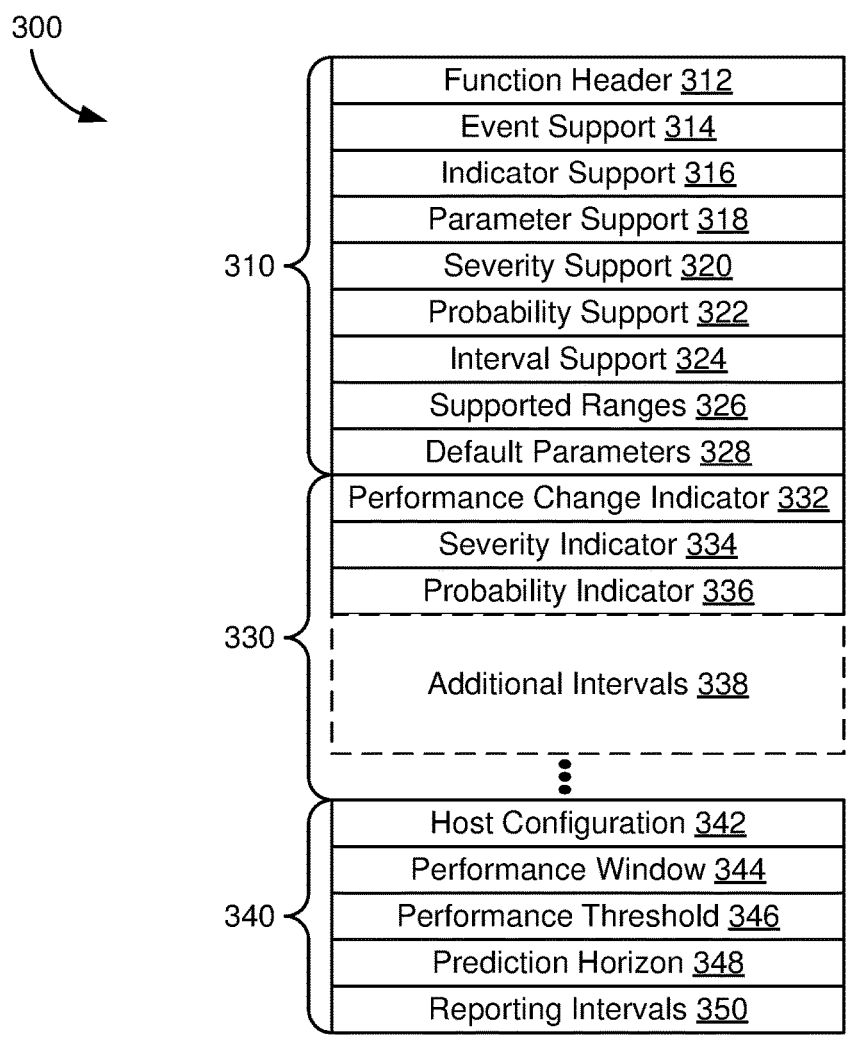
FIG. 3 schematically illustrates a performance interface registry that may be used by the storage system of FIG. 1.

FIG. 3 shows a schematic representation of a performance interface register 300 that may be used by the storage system 100 of FIG. 1. For example, storage devices 120 may include a set of memory locations configured as a registry allocated for a predictive performance monitoring function and accessible to host device 102. In some embodiments, performance interface register 300 may include a plurality of fields or parameters for communicating performance related support parameters 310, performance change indicators 330, and/or configuration parameters. Various fields may include different access privileges for one or both devices. For example, support parameters 310 may be read-only fields for describing the performance monitoring function, parameters, arguments, and extensions supported by storage device 120. Performance change indicators 330 may be read/write fields for storage device 120, but read-only for host device 102 to enable storage device 120 to selectively provide performance change indicators to host device 102 in indicator memory locations. Configuration parameters 340 may be read/write for host device 102 to enable host device 102 to check current configuration parameter settings and/or set new host configuration parameters, for example, as described above with regard to FIG. 2.

In some embodiments, support parameters 310 may include a plurality of support parameter fields, such as: a function header 312 configured to include values identifying the performance function and/or the scope and layout of the register; event support 314 configured to include values identifying an event notification mechanism, such as setting an event bit elsewhere in the storage interface or leveraging another storage event notification process; indicator support 316 configured to include values identifying the types of performance change indicators supported by the function; parameter support 318 configured to include values identifying the performance parameters and/or units of those performance parameters supported by the function; severity support 320 configured to include values identifying a number of severity levels or incremental thresholds for determining and/or classifying performance changes supported by the function; probability support 322 configured to include values identifying whether reporting prediction probability or reliability parameters is supported by the function; interval support 324 configured to include values identifying whether multiple time intervals and/or prediction horizons are supported by the function; supported ranges 326 configured to include values identifying the acceptable range of one or more host-configurable configuration parameters, such as configuration parameters 340, supported by the function; and default parameters 328 configured to include default values for one or more configuration parameters, such as configuration parameters 340, used by the function (absent host device 102 setting host configuration values). For example, each field may be identified by a memory location, such as start position to end position or start position and length, a field or parameter tag, and/or another mechanism for identifying the specific field and its contents. In an alternate embodiment, the plurality of support parameter field values may be provided in a messaging or command/response configuration where host device 102 sends a function definition command and storage device 120 responds with one or more of the fields/values from support parameters 310.

In some embodiments, performance change indicators 330 may include a plurality of performance change indicator fields, such as: performance change indicator 332 configured to include a performance change flag or similar binary performance change indicator for communicating when a change condition exists; severity indicator 334 configured to include severity values quantifying the amount and/or timing of a predicted change condition; and probability indicator 336 configured to include probability and/or reliability values to quantify the likelihood of a predicted change occurring. In some embodiments, performance change indicators 330 may support prediction reporting over multiple time intervals out to the prediction horizon. For example, performance change indicators 330 may be provided for additional time intervals 338, such as every minute, 5 minute interval, 10 minute interval, etc. from the current time to the prediction horizon. Each field in performance change indicators 330 may be identified by a memory location, such as start position to end position or start position and length, a field or parameter tag, and/or another mechanism for identifying the specific field and its contents. In an alternate embodiment, the plurality of performance change indicator field values may be provided in a messaging or notification configuration where storage device 120 generates event-based or periodic notification messages to host device 102 containing one or more of the fields/values from performance change indicators 330.

In some embodiments, configuration parameters 340 may include a plurality of host configuration parameter fields, such as: host configuration 342 configured to include values identifying a particular host configuration, such as a host device identifier and/or a configuration identifier corresponding to specific host access patters, commands, and/or use cases; performance window 344 configured to include one or more host performance window values; performance threshold 346 configured to include one or more host performance threshold values, such as performance threshold values defining different severity levels; prediction horizon 348 configured to include one or more performance prediction horizon values; and reporting intervals 350 configured to include one or more reporting interval values for setting interval-based prediction of performance change values from a current time to the reporting horizon. Each field in configuration parameters 340 may be identified by a memory location, such as start position to end position or start position and length, a field or parameter tag, and/or another mechanism for identifying the specific field and its contents. In an alternate embodiment, the plurality of host configuration field values may be provided in a messaging or command/response configuration where host device 102 sends a configuration set command and storage device 120 responds with a confirmation message.

Figure 4:
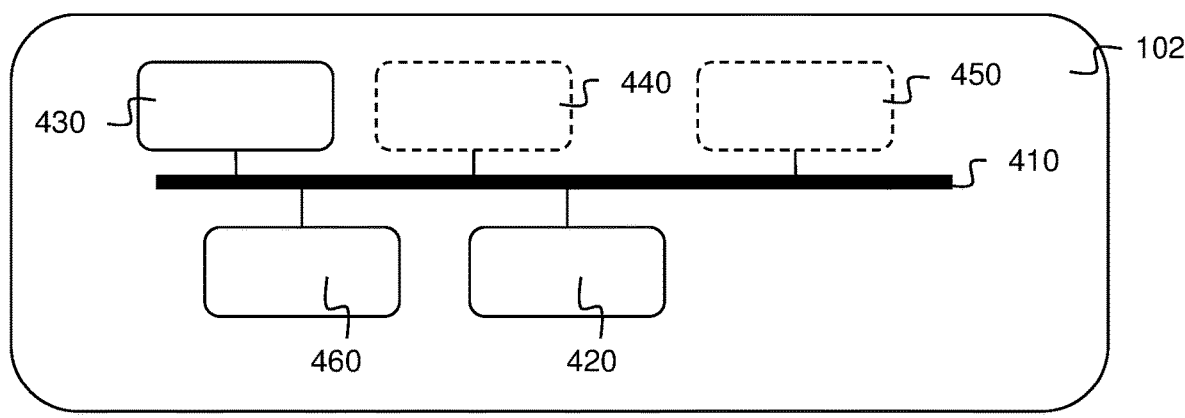
FIG. 4 schematically illustrates a host device of the storage system of FIG. 1.

FIG. 4 shows a schematic representation of an example host device 102. Host device 102 may comprise a bus 410, a host processor 420, a host memory 430, one or more optional input units 440, one or more optional output units 450, and a communication interface 460. Bus 410 may include one or more conductors that permit communication among the components of host 102. Processor 420 may include any type of conventional processor or microprocessor that interprets and executes instructions. Host memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. For example, performance interface protocol 210, performance window control 220, performance threshold control 230, performance prediction horizon control 240, performance tracking control 250, performance data handler 270, and/or performance response handler 280 in FIG. 2 may be instantiated in instructions, operations, or firmware stored in host memory 430 for execution by host processor 420. An optional input unit 440 may include one or more conventional mechanisms that permit an operator to input information to host 102 such as a keyboard, a mouse, a pen, voice recognition and/or biometric mechanisms, etc. In some embodiments, optional input unit 440 may include image, audio, infrared, and/or other sensors for video camera or other consumer electronics functions. Optional output unit 450 may include one or more conventional mechanisms that output information to the operator, such as a display, a printer, a speaker, etc. Communication interface 460 may include any transceiver-like mechanism that enables host 102 to communicate with other devices and/or systems. In some embodiments, communication interface 460 may include one or more peripheral interfaces, such as a PCIe, USB, SD, SDXC, or other interface for connecting to storage device 120 and/or a network interface for communicating with storage device 120 over a fabric network.

Figure 5:
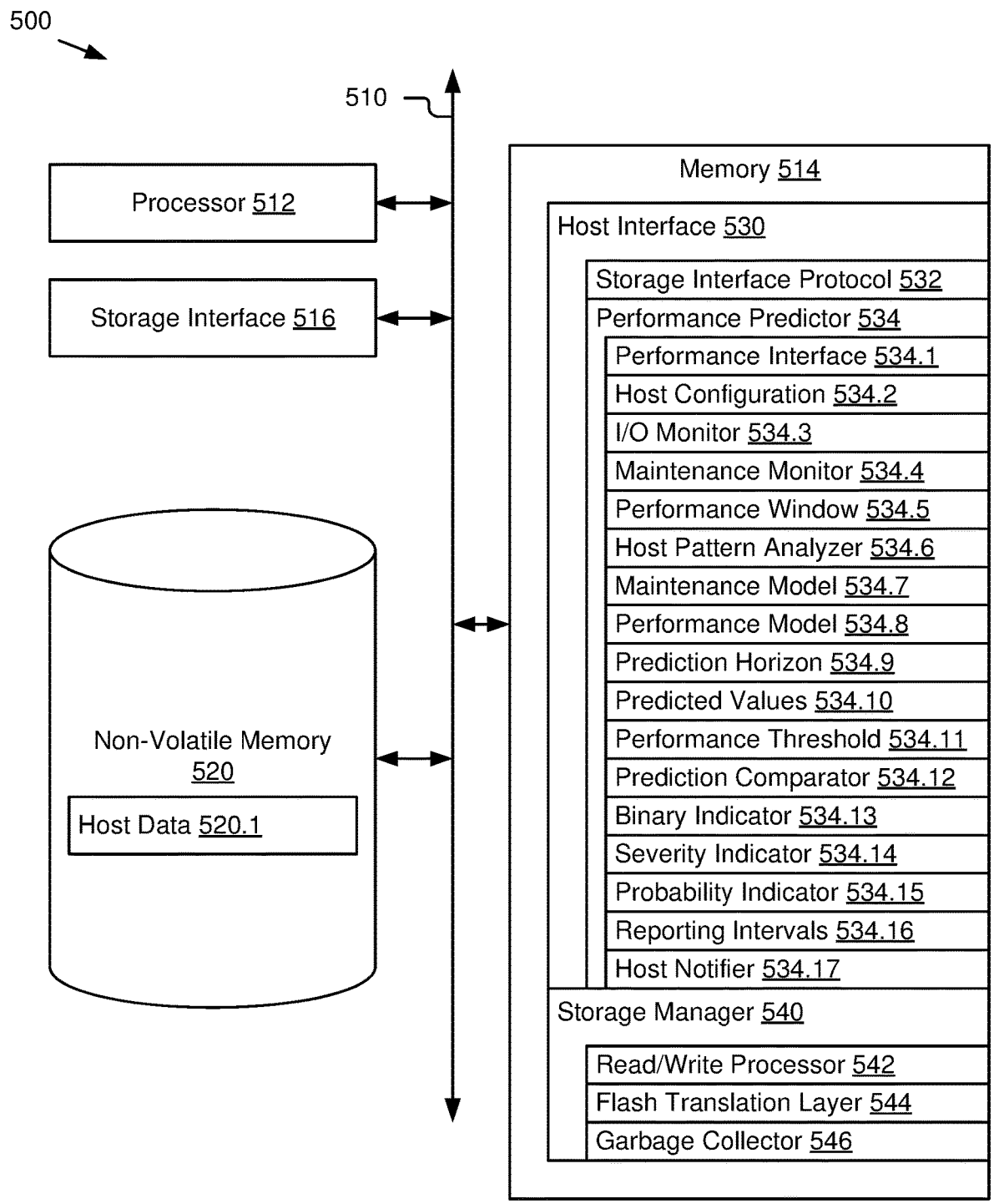
FIG. 5 schematically illustrates some elements of the storage system of FIG. 1-4 in more detail.

FIG. 5 schematically shows selected modules of a storage device 500 configured for reporting predicted changes in performance based on maintenance operations to other system nodes, such as host or client systems. Storage device 500 may incorporate elements and configurations similar to those shown in FIGS. 1-3. For example, storage device 500 may be a storage device configured as storage device 120 in storage system 100, where the storage device includes: bus 510, processor 512, memory 514 (instantiating host interface 530 and storage manager 540), and storage interface 516 in storage device controller 130; and non-volatile memory 520 in NVM devices 140.

Storage device 500 may include a bus 510 interconnecting at least one processor 512, at least one memory 514, and at least one interface, such as storage interface 516. Bus 510 may include one or more conductors that permit communication among the components of storage device 500. Processor 512 may include any type of processor or microprocessor that interprets and executes instructions or operations. Memory 514 may include a random access memory (RAM) or another type of dynamic storage device that stores information and instructions for execution by processor 512 and/or a read only memory (ROM) or another type of static storage device that stores static information and instructions for use by processor 512 and/or any suitable storage element such as a hard disk or a solid state storage element.

Storage interface 516 may include a physical interface for communication between a storage device and a host or client using an interface protocol that supports storage device access. For example, storage interface 516 may include a USB, SD, SDXC, PCIe, serial advanced technology attachment (SATA), serial attached small computer system interface (SCSI) (SAS), or similar storage interface connector supporting access to solid state media comprising non-volatile memory devices 520. In some embodiments, storage interface 516 may connect to or incorporate a network interface for connecting to a fabric network and/or other network. For example, storage interface 516 may connect to a network fabric interface through a backplane network and/or storage network interface controller supporting an NVMe-over-fabric (NVMeoF) protocol. In some embodiments, storage device 500, hosts, clients, and/or other components of the storage system may be configured as nodes in the NVMeoF topology and communicate using supported NVMe commands, such as NVMe telemetry commands.

Storage device 500 may include one or more non-volatile memory devices 520 configured to store host data 520.1. For example, non-volatile memory devices 520 may include a plurality of flash memory packages organized as an addressable memory array. In some embodiments, non-volatile memory devices 520 may include NAND or NOR flash memory devices comprised of single level cells (SLC), multiple level cell (MLC), triple-level cells (TLC), quad-level cells (QLC), penta-level cells (PLC), etc. In some embodiments, non-volatile memory devices 520 may include the storage medium of a storage device, such as NVM devices 140 in storage devices 120.

Storage device 500 may include a plurality of modules or subsystems that are stored and/or instantiated in memory 514 for execution by processor 512 as instructions or operations. For example, memory 514 may include a host interface 530 configured to receive, process, and respond to host data requests and/or management commands from client or host systems. Memory 514 may include storage manager 540 configured to manage storage and management operations to the media devices comprising non-volatile memory 520.

Host interface 530 may include an interface protocol and/or set of functions, parameters, and/or data structures for receiving, parsing, responding to, and otherwise managing host data requests from a host. For example, host interface 530 may include functions for receiving and processing host requests for reading, writing, modifying, or otherwise manipulating data blocks and their respective client or host data and/or metadata in accordance with host communication and storage protocols. Host interface 530 may also support administrative commands and/or management operations initiated by the host or the storage device, such as configuration changes, garbage collection, log access, firmware management, reporting of operational parameters, notification of predicted performance change indicators, etc. For example, host interface 530 may support administrative command sets for configuring namespaces, queue control, log access, feature identification and configuration, security settings, and/or performance monitoring. In some embodiments, host interface 530 may enable direct memory access and/or access over NVMe protocols through storage interface 516. For example, host interface 530 may include host communication protocols compatible with USB, SD, SDXC, PCIe, SATA, SAS, and/or another bus interface. Host interface 530 may further include performance interface protocols compatible with configuring and enabling predicting and reporting performance changes based on maintenance operations. For example, host interface 530 may collect relevant operating parameters, calculate predicted performance parameters, compare the predicted parameters against one or more performance thresholds, and report predicted performance change indicators from storage device 500 on a periodic, event-based, or host-response basis.

In some embodiments, host interface 530 may include a plurality of hardware and/or software modules configured to use processor 512 and memory 514 to handle or manage defined operations of host interface 530. For example, host interface 530 may include a storage interface protocol 532 configured to comply with the physical, transport, and storage application protocols supported by the host for communication over storage interface 516. For example, storage interface protocol 532 may include USB, SD, SDXC, PCIe, NVMe, and/or other protocol compliant communication, command, and syntax functions, procedures, and data structures. In some embodiments, host interface 530 may include a performance predictor 534 configured to provide functions processing and interfaces for predictive performance monitoring and reporting. In some embodiments, host interface 530 may include additional modules (not shown) for input/output (I/O) commands, buffer management, storage device configuration and management, and other host-side functions.

In some embodiments, performance predictor 534 may be configured to handle predicting performance monitoring in order to notify a host device of a predicted change in storage processing performance before the predicted change actually occurs. Performance predictor 534 may be comprised of a plurality of interfaces, functions, parameters, data structures, and related logic for executing or supporting one or more functional aspects of performance predictor 534. For example, performance predictor 534 may include performance interface 534.1, host configuration 534.2, I/O monitor 534.3, maintenance monitor 534.4, performance window 534.5, host pattern analyzer 534.6, maintenance model 534.7, performance model 534.8, prediction horizon 534.9, predicted values 534.10, performance threshold 534.11, prediction comparator 534.12, binary indicator 534.13, severity indicator 534.14, probability indicator 534.15, reporting intervals 534.16, and host notifier 534.17. Not all embodiments will include all performance monitoring features or functions.

Performance interface 534.1 may include one or more interfaces configured for communication with a host device regarding performance predictor capabilities, configuration, and access to the predicted performance indicators generated by performance predictor 534. For example, performance interface 534.1 may be configured using a performance interface protocol, registry, and/or message structure similar to those described above with regard to FIGS. 2 and 3. In some embodiments, performance interface 534.1 may enable host configuration 534.2. Host configuration 534.2 may include one or more host-configurable parameters that may include default values and/or be set by host interactions through performance interface 534.1. For example, host configuration 534.2 may include a plurality of host configuration values set by the host device as described above with regarding to FIGS. 2 and 3.

I/O monitor 534.3 may include one or more interfaces or functions for collecting or accessing operating parameters regarding the processing of host storage operations, such as read, write, and delete commands. For example, I/O monitor 534.3 may access registers or data structures within or maintained by storage manager 540 to aggregate storage operations data, such as number, type, size, timing, processing resources, etc. of executed storage operations. In some embodiments, I/O monitor 534.3 may be configured to collect IOPS, MB/s, and similar aggregate operations data.

Maintenance monitor 534.4 may include one or more interfaces or functions for collecting or accessing operating parameters regarding the processing of maintenance operations, such as garbage collection. For example, maintenance monitor 534.4 may access registers or data structures within or maintained by storage manager 540 to aggregate maintenance operations data, such as valid/invalid fragment counts, garbage collection operation counts, timing, processing resources, available blocks, etc.

In some embodiments, performance window 534.4 may include one or more performance window parameters for determining an operating period during which operating data from I/O monitor 534.3 and/or maintenance monitor 534.4 may be aggregated for a performance prediction calculation. For example, a default or host-configured performance window value may determine that operating data be collected for 30 seconds before initiating a performance prediction calculation. In some embodiments, the performance window may determine how often the performance prediction is calculate, such as at intervals equal to the performance window. Host pattern analyzer 534.6 may include functions or logic for analyzing host storage operations to identify host access patterns. For example, host pattern analyzer 534.6 may compare host I/O patterns to one or more access pattern baseline values, such as sequential write, random write, sequential read, random read, and/or more complex patterns including combinations, sequences, and/or percentages of two or more base patterns.

In some embodiments, performance predictor 534 may include maintenance model 534.7 and/or performance model 534.8 to generate predicted performance values 534.10 at one or more prediction horizons 534.9 based on the storage and maintenance parameters collected by 110 monitor 534.3 and maintenance monitor 534.4. For example, maintenance model 534.7 may include one or more algorithms correlating a collected maintenance parameter, such as the valid fragment count of erase blocks, to determine changing need for garbage collection. In some embodiments, maintenance model 534.7 may be used to determine a predicted increase in processing resource usage by garbage collection or other maintenance operations. Performance model 534.8 may include one or more algorithms correlating changes in available processing resources (due to priority allocation to maintenance operations) to future processing performance parameters for storage operations. In some embodiments, maintenance model 534.7 and/or performance model 534.8 may use operating parameters collected over performance window 534.5 and/or the host pattern identified by host pattern analyzer 534.6 as input parameters to their respective models and predicted performance values. In some embodiments, one or more predicted maintenance performance values from maintenance model 534.7 may be used as an input parameter to performance model 534.8. Prediction horizon 534.9 may be an input parameter to one or both models that determines a maximum time value to be used for the prediction. In some embodiments, prediction horizon 534.9 may include a plurality of time values that include both the maximum value and one or more interval values between the time of the prediction calculation and the maximum value to generate predicted performance values 534.10 at a plurality of time points within the prediction horizon. Predicted performance values 534.10 may include one or more storage operation performance values, such as IOPS or MB/s that may be used to determine whether predicted performance will be within the performance expectations or needs of the host device.

Predicted performance values 534.10 may be compared against one or more performance thresholds 534.11 by prediction comparator 534.12. Predicted performance values 534.10 may include parameter values corresponding to the prediction output of performance model 534.8. For example, predicted performance values 534.10 may include an array of performance values corresponding to future time points. Performance thresholds 534.11 may include parameter values corresponding to default and/or host-configured storage operation processing requirements. For example, performance thresholds 534.11 may include one or more notification or severity thresholds based on storage operation volumes or throughput requirements of one or more host applications. Prediction comparator 534.12 may include functions or logic for comparing one or more predicted performance values 534.10 to one or more performance thresholds 534.11 to determine when the performance value for a future timepoint crosses a performance threshold for generation of a performance change indicator, such as binary indicator 534.13, severity indicator 534.14, and/or probability indicator 534.15.

Performance change indicators may include parameters exposed to or send to the host device to indicate that at least one predicted performance change meeting performance threshold 534.11 has been determined by performance model 534.8 within prediction horizon 534.9. For example, performance predictor 534 may write a performance change indicator to a performance interface register and/or include it in a notification message to the host device. Binary indicator 534.13 may include a flag or similar indicator value that indicates whether a predicted performance change condition exists or does not exist. In some embodiments, binary indicator 534.13 may be associated with the predicted performance condition at prediction horizon 534.9 and/or one or more intermediate time intervals and/or include predicted value 534.10 that triggered the performance change indicator. Severity indicator 534.14 may include a plurality of indicator values corresponding to different severity conditions. For example, different severity conditions may be defined based on a series of threshold values, such as 80% IOPS, 60% IOPS, and 40% IOPS (from the nominal maximum IOPS value of the storage device) or based on a series of time values, such as 30 seconds, 1 minute, 5 minutes, and 10 minutes until predicted change. Probability indicator 534.15 may include one or more indicator values associated with binary indicator 534.13 and/or severity indicator 534.14 to quantify the probability or likelihood of predicted values 534.10. For example, maintenance model 534.7 and/or performance model 534.8 may include statistical and/or probabilistic algorithms that have associated reliability or probability factors. Such reliability or probability values may be stored or sent with the corresponding predicted values 534.10 and/or other performance change indicators.

In some embodiments, performance predictor 534 may include reporting intervals 534.16 configured to determine the frequency with which predicted values 534.10 are calculated and selectively reported through performance interface 534.1. Reporting intervals 534.16 may include parameters and logic for determining the interval between calculations, threshold evaluations, and reporting of predicted performance changes. For example, reporting intervals 534.16 may equal performance window 534.5 and/or another periodic value, generally greater than performance window 534.5 and less than prediction horizon 534.9. In some embodiments, performance predictor 534 may be configured to report performance change indicators based on reporting intervals 534.16 without determining that predicted changes will cross performance threshold 534.11. Host notifier 534.17 may include interfaces, functions, parameters and logic for notifying the host device of a predicted performance change. For example, host notifier 534.17 may trigger an event notification, such as an event notification register or event notification message supported by storage interface protocol 532.

Storage manager 540 may include an interface protocol and/or set of functions, parameters, and data structures for reading, writing, and deleting data units in non-volatile memory devices 520. For example, storage manager 540 may include a read/write processor 542 for executing host data operations related to host storage commands received through host interface 530. For example, PUT or write commands may be configured to write host data units to non-volatile memory devices 520 through a write processor. GET or read commands may be configured to read data from non-volatile memory devices 520 through a read processor. DELETE commands may be configured to delete data from non-volatile memory devices 520, or at least mark a data location for deletion until a future garbage collection or similar operation actually deletes the data or reallocates the physical storage location to another purpose. In some embodiments, storage manager 540 may include flash translation layer (FTL) management 544, data state machine, read/write buffer management, NVM device interface protocols, NVM device configuration/management/maintenance, and other device-side functions. Storage manager 540 may include a garbage collector 546 configured to consolidate valid data units into new programming blocks to enable invalid data units to be erased and allow their programming blocks to be reused. For example, garbage collector 546 may include logic for selecting programming blocks to be collected based on various data parameters, such as data age, valid fragment count, available capacity, etc., and may determine or access data and operating parameters related to such logic. In some embodiments, garbage collector 546 may include progressive logic that becomes more aggressive in reclaiming programming blocks as the number of available programming blocks decreases. Storage manager 540 may include various functions that generate operational parameters, such as workload data, error rates, configuration parameters, physical parameters, storage parameters (e.g., aggregate storage space used/available/marked for garbage collection, wear leveling statistics, etc.), error logs, event logs, and other operational parameters that may be aggregated and reported through various interfaces, functions, or services.

Figure 6:
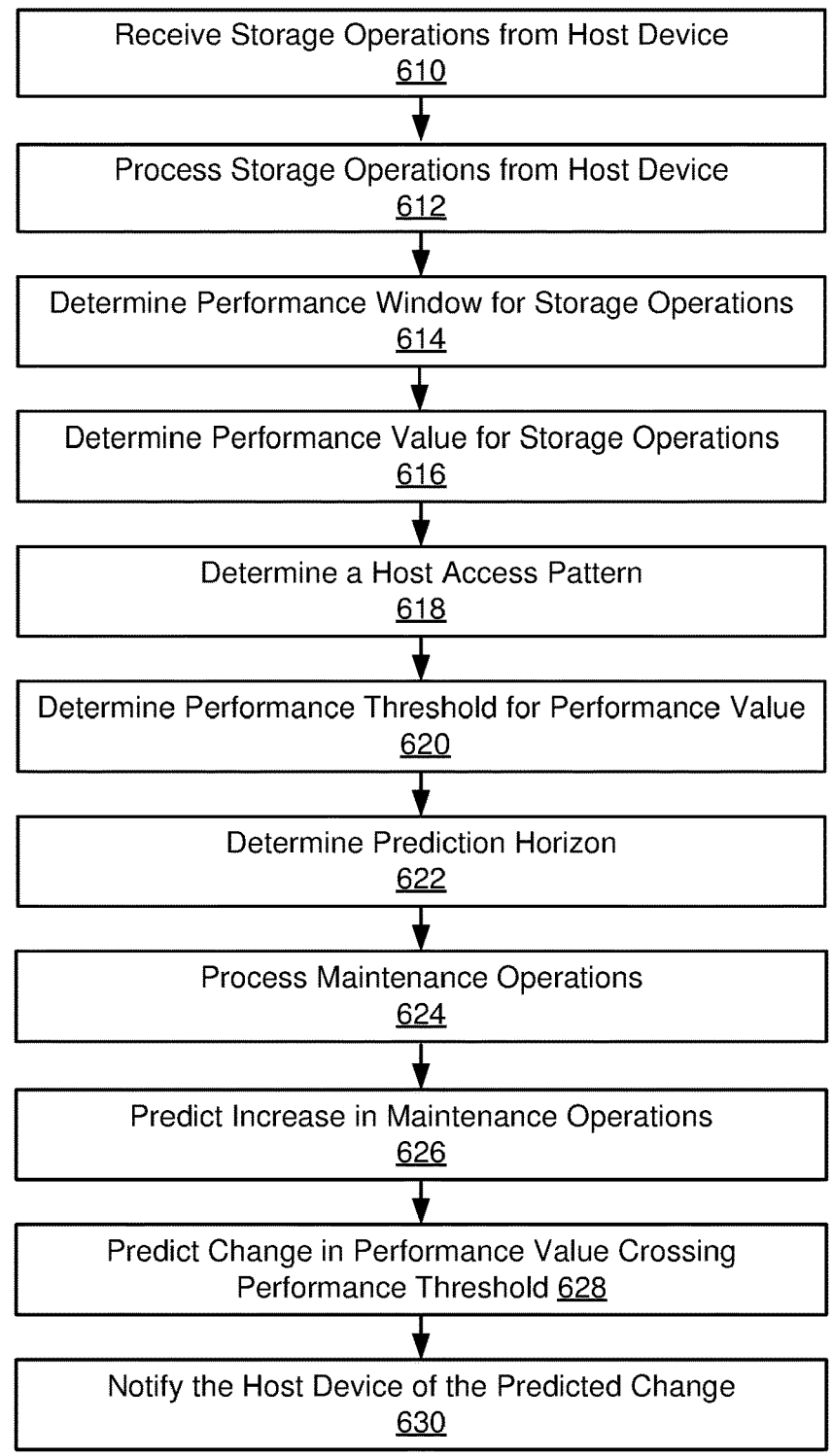
FIG. 6 is a flowchart of an example method of providing predictive performance change indicators to a host device.

As shown in FIG. 6, storage device 500 may be operated according to an example method for providing predictive performance change indicators to a host device, i.e., according to method 600 illustrated by blocks 610-630 in FIG. 6.

At block 610, storage operations may be received from a host device. For example, a host interface may receive read, write, and delete commands from the host device to manipulate host data stored by the storage device.

At block 612, storage operations from the host device may be processed. For example, the host interface may parse storage commands and generate storage processing tasks executed by a storage manager against the non-volatile media of the storage device.

At block 614, a performance window may be determined for storage operations. For example, a performance predictor may be configured to use a default or host-configured performance window value to set a time window in which performance operations may be analyzed for performance prediction.

At block 616, a performance value may be determined for the storage operations during the performance window. For example, the performance predictor may aggregate data from the storage manager regarding the storage operations processed during the performance window and express them as a number of operations per unit time or a storage volume per unit time.

At block 618, a host access pattern may be determined. For example, the performance predictor and/or storage manager may recognize, classify, and/or quantify the pattern of storage operations received and processed during the performance window.

At block 620, a performance threshold may be determined. For example, the performance predictor may be configured to determine a default or host-configured performance threshold value for use in predicting performance changes sufficient to trigger a notification event.

At block 622, a prediction horizon may be determined. For example, the performance predictor may be configured to determine a default or host-configured performance prediction horizon value for use in determining how far into the future performance values and changes should be predicted.

At block 624, maintenance operations may be processed. For example, the storage manager may be configured to process maintenance operations, such as garbage collection, in parallel with storage operations as the need for maintenance operations increases, such as after available capacity drops below a capacity threshold value.

At block 626, an increase in maintenance operations may be predicted. For example, the performance predictor may use a maintenance model and maintenance and storage parameters aggregated during the performance window to predict increased maintenance operations at a future timepoint.

At block 628, a change in performance value that crosses a performance threshold may be predicted. For example, the performance predictor may use a performance model, host access pattern, increased maintenance operation parameters, and/or other operating parameters aggregated during the performance window to calculate a performance value and compare the performance value to one or more performance threshold values to determine whether the predicted performance value crosses a performance threshold.

At block 630, the host device may be notified of the predicted change. For example, the performance predictor may use a performance interface protocol to notify the host device of the predicted performance change.

Figure 7:
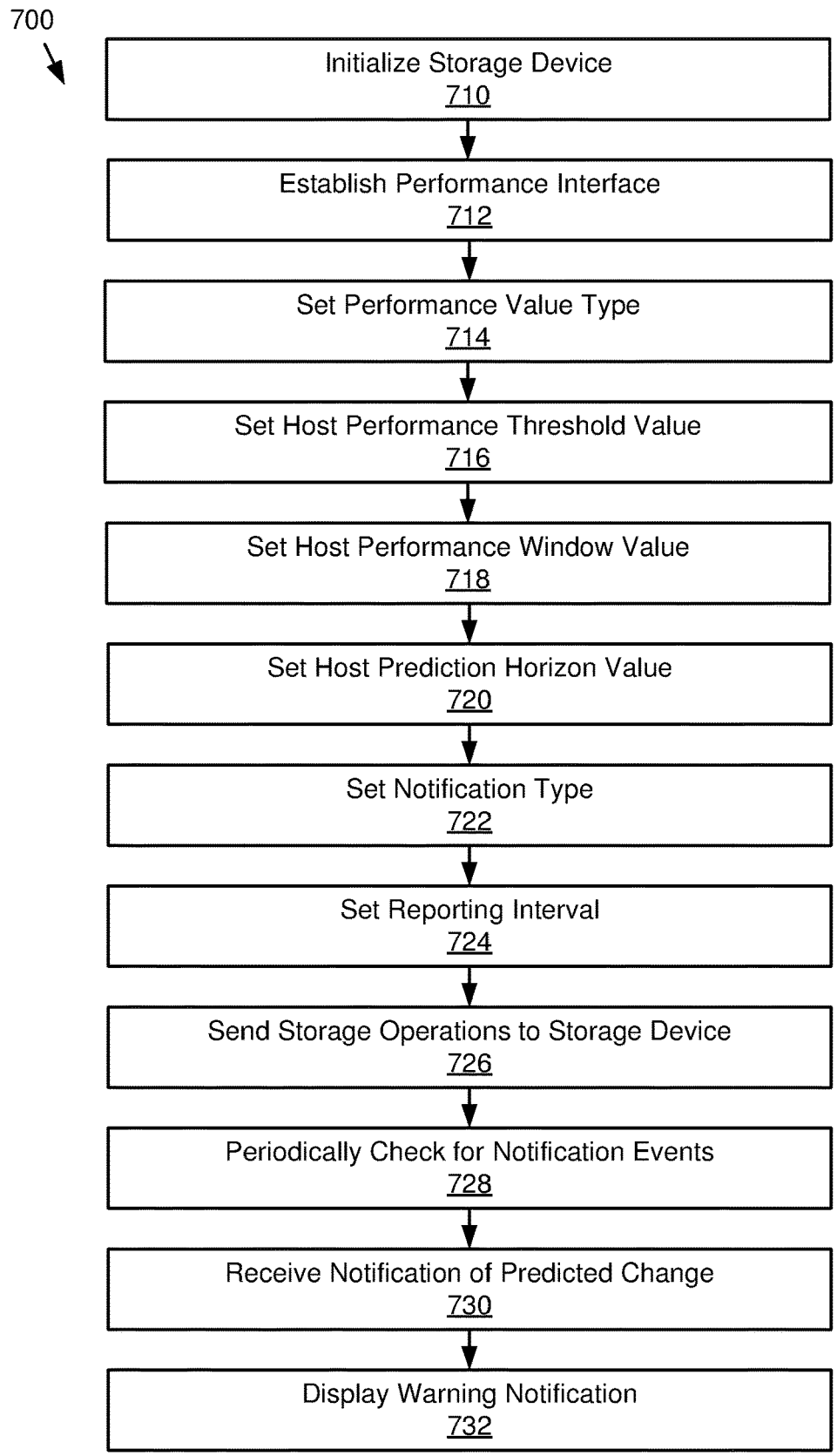
FIG. 7 is a flowchart of an example method of configuring predictive performance change indicators by a host device.

As shown in FIG. 7, storage system 200 may be operated according to an example method for configuring predictive performance change indicators by host device 102, i.e., according to method 700 illustrated by blocks 710-718 in FIG. 7.

At block 710, a storage device may be initialized. For example, the host device may initialize a removable storage device through a storage interface to initiate communication with the storage device.

At block 712, a performance interface may be established with the storage device. For example, the storage interface may support an embedded performance interface as a set of interface registers, functions, and/or commands for configuring performance prediction operations and notifications.

At block 714, a performance value type may be set. For example, the performance interface may support a plurality of performance value types or units for measuring storage device I/O performance and the host device may determine the performance value type or types to be used by the storage device.

At block 716, a host performance threshold value may be set. For example, the performance interface may include a default value for the performance threshold and the host device may change the default value to a host-configured threshold value through the performance interface.

At block 718, a host performance window value may be set. For example, the performance interface may include a default value for the performance window and the host device may change the default value to a host-configured threshold value through the performance interface.

At block 720, a host prediction horizon value may be set. For example, the performance interface may include a default value for the prediction horizon and the host device may change the default value to a host-configured prediction horizon value through the performance interface.

At block 722, a notification type may be set. For example, the performance interface may support a plurality of notification types, such as event notification flags, event logs, notification messages, etc., and the host device may select a preferred notification type to receive.

At block 724, a reporting interval may be set. For example, the performance interface may support configuration of a reporting interval to determine how often performance predictions are updated and the host device may set a preferred reporting interval value, such as the performance window or a multiple thereof.

At block 726, storage operations may be sent to the storage device. For example, the host device may send read, write, and delete commands to the storage device for processing in accordance with the storage protocols used between the devices.

At block 728, notification events may be periodically checked. For example, the storage device may be configured for passive notification and the host device may initiate a read operation against an event flag, event log, or similar interface structure to determine that a performance change has been predicted.

At block 730, notification of the predicted change may be received. For example, the event flag may indicate that the performance interface register should be read to receive the performance change indicators associated with the notification event or the host device may request and receive a notification message containing the performance change indicators.

At block 732, a warning notification may be displayed to a user. For example, the host device may include logic for responding to the performance change indicators and generating a visual, audible, tactile, and/or other warning notification to a user of the host device of the predicted change in performance. In alternate embodiments, the host device may respond by adjusting its access pattern to the device, re-allocating resources for device communication channels, or other host actions to compensate for the predicted performance change.

Figure 8:
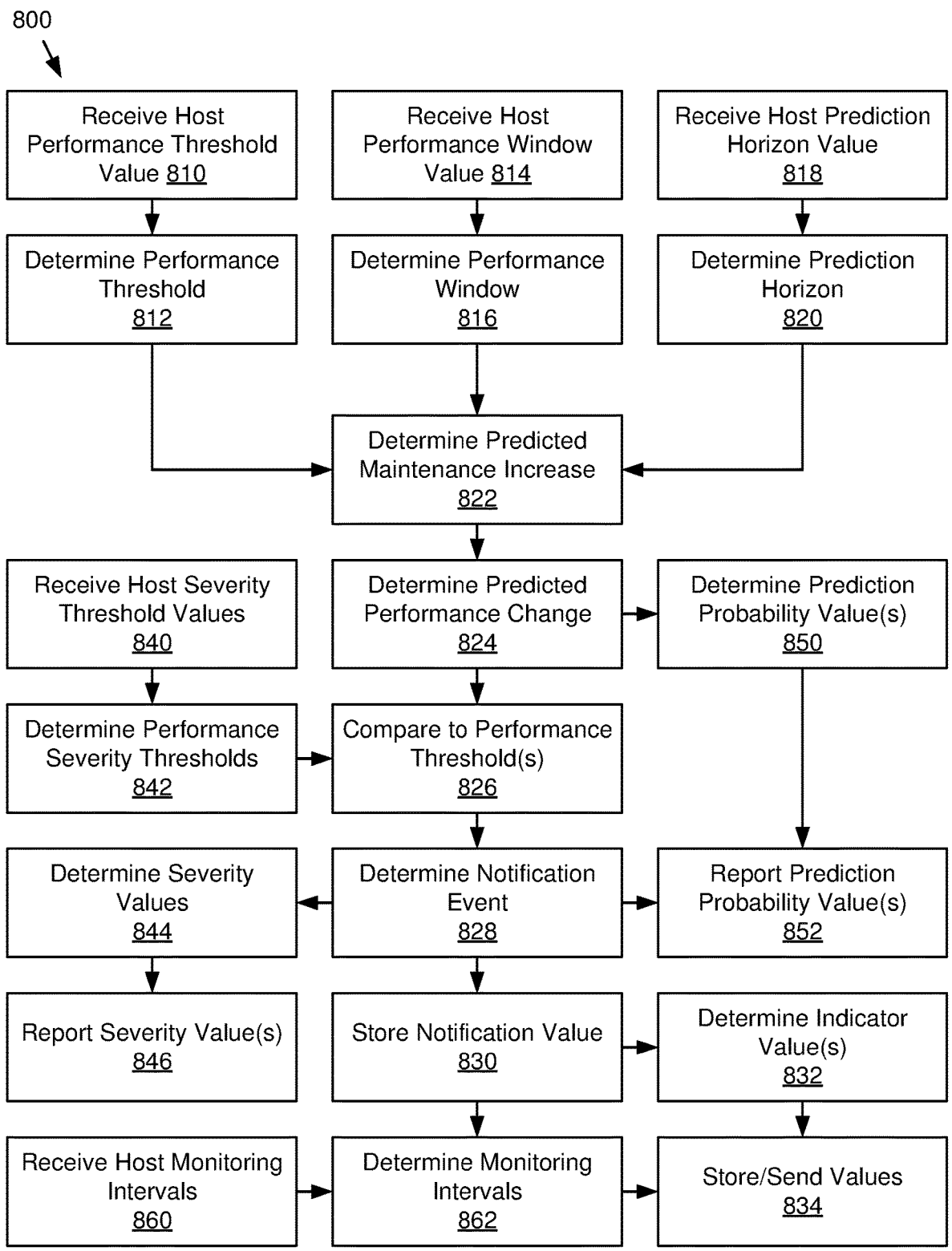
FIG. 8 is a flowchart of an example method of generating configurable predictive performance change indicators.

As shown in FIG. 8, storage device 500 may be operated according to an example method for generating configurable predictive performance change indicators, i.e., according to method 800 illustrated by blocks 810-824 in FIG. 8. In some embodiments, one or more blocks of method 800 may be used in conjunction with method 600 in FIG. 6.

At block 810, a host performance threshold value may be received. For example, the storage device may receive host-configured performance threshold values through a host interface.

At block 812, the performance threshold to be used for the performance prediction may be determined. For example, the host-configured performance threshold values may be set as the performance thresholds for the next performance prediction calculated.

At block 814, a host performance window value may be received. For example, the storage device may receive host-configured performance window values through the host interface.

At block 816, the performance window to be used for the performance prediction may be determined. For example, the host-configured performance window values may be set as the performance window for the next performance prediction calculated.

At block 818, a host prediction horizon value may be received. For example, the storage device may receive host-configured prediction horizon values through the host interface.

At block 820, the prediction horizon to be used for the performance prediction may be determined. For example, the host-configured prediction horizon values may be set as the prediction horizon for the next performance prediction calculated.

At block 822, a predicted maintenance increase may be determined. For example, the performance predictor may calculate a predicted maintenance increase based on the performance window and prediction horizon.

At block 824, a predicted performance change may be determined. For example, the performance predictor may use the performance window, the prediction horizon, and the predicted maintenance increase to calculate performance values at future times and/or corresponding performance value changes.

At block 826, the predicted performance values may be compared to performance thresholds. For example, the performance predictor may compare one or more predicted performance values to one or more performance thresholds.

At block 828, a notification event may be determined. For example, the performance predictor may determine, based on the comparison of the predicted performance values and the performance thresholds that one or more threshold have been crossed, generating a notification event.

At block 830, a notification value may be stored. For example, the performance predictor may store a notification value to a notification register or log accessible to the host device.

At block 832, one or more performance change indicator values may be determined. For example, the performance predictor may determine binary, severity, and/or probability performance change indicators that communicate the predicted performance change event and related parameters.

At block 834, the performance change indicator values may be stored or sent to the host device. For example, the performance predictor may store the performance change indicator values in a host-accessible performance interface location and/or send a message including the performance change indicator values to the host device through the storage interface.

At block 840, host severity thresholds may be received from the host device. For example, the storage device may receive host-configured severity threshold values through the host interface.

At block 842, the severity thresholds to be used for the performance prediction may be determined. For example, the host-configured severity threshold values may be set as the severity thresholds for the next performance prediction calculated and used at block 828.

At block 844, severity values may be determined. For example, the performance predictor may determine severity values based on the severity threshold or thresholds crossed.

At block 846, the severity thresholds may be reported to the host device. For example, the severity values may be reported with predicted performance change indicators at blocks 832 and 834.

At block 850, prediction probability values may be determined. For example, the performance predictor may calculate prediction probability values alongside the predicted performance values in the performance model.

At block 852, the prediction probability values may be reported to the host device. For example, the prediction probability values may be reported with predicted performance change indicators at blocks 832 and 834.

At block 860, host monitoring interval values may be received from the host device. For example, the storage device may receive host-configured monitoring interval values through the host interface.

At block 862, monitoring intervals to be used for determining how frequently indicator values are reported may be determined. For example, the host-configured monitoring intervals may be set as the monitoring intervals for the next performance prediction calculated and used to determine when other calculations are initiated and/or when values are stored or sent at block 834.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system comprising:
a host device comprising:
a host processor;
a host memory;
a storage interface configured to communicate with a host interface of a data storage device;
a user interface display; and
a storage manager configured to:
send storage operations to the data storage device according to a defined host access pattern and a storage performance requirement;
receive, from the data storage device, notification of a predicted change in a performance value; and
display, to a user of the host device and through the user interface display, a warning notification indicating the predicted change in the performance value.

2. The system of claim 1, wherein:
the performance value is selected from:
an input/output operations per unit time value;
a data volume per unit time value; and
a nominal performance value for the data storage device;
the storage manager is further configured to:
determine a performance threshold for the performance value; and
send the performance threshold to the data storage device; and
receiving notification of the predicted change in the performance value is responsive to the data storage device determining that the predicted change in the performance value crosses the performance threshold.

3. The system of claim 1, wherein:
the storage manager is further configured to:
determine a host performance window value; and
send, to the data storage device, the host performance window value; and
receiving notification of the predicted change in the performance value is responsive to the data storage device determining an increase in maintenance operations over the host performance window.

4. The system of claim 1, wherein:
the storage manager is further configured to:
determine a host prediction horizon value; and send, to the data storage device, a host prediction horizon value; and receiving notification of the predicted change in the performance value is responsive to the data storage device determining an increase in maintenance operations at a future time corresponding to the host prediction horizon value.

5. The system of claim 1, wherein:

the storage manager is further configured to determine a plurality of severity thresholds;

receiving notification of the predicted change in the performance value includes receiving a severity value for the predicted change; and the severity value for the predicted change corresponds to at least one severity threshold of the plurality of severity thresholds.

6. The system of claim 1, wherein:

receiving notification of the predicted change in the performance value includes receiving a prediction probability value for the predicted change in the performance value; and displaying the warning notification indicating the predicted change in the performance value includes displaying the prediction probability value.

7. The system of claim 1, wherein:

the host interface of the data storage device includes a notification register; and the storage manager is further configured to:
periodically check the notification register; and
receive, from the data storage device and responsive to checking the notification register, notification of the predicted change in the performance value.

8. The system of claim 1, wherein:

the host interface of the data storage device includes an interface function register comprising a plurality of memory locations; and receiving notification of the predicted change in the performance value includes reading at least one performance change indicator value in an indicator memory location of the plurality of memory locations in the interface function register.

9. The system of claim 1, further comprising:

a data storage device comprising:
the host interface;
a storage medium configured to store host data; and
a storage device controller comprising processing resources and configured to:
process, using the storage medium and the processing resources, storage operations from the host device;
process, using the storage medium and the processing resources, maintenance operations for increasing storage availability in the storage medium;
determine the performance value for the storage operations;
predict an increase in maintenance operations;
predict, based on the predicted increase in maintenance operations, the predicted change in the performance value; and
notify, through the host interface, the host device of the predicted change in the performance value.

10. The system of claim 9, wherein:

the data storage device comprises a removable storage device configured to be removably attached to the host device;

the host device is configured to initialize the data storage device;

the storage manager is further configured to:
establish, responsive to initializing the data storage device, a performance interface with the data storage device; and
set, through the performance interface, at least one performance monitoring parameter selected from:
a performance value type;
a host performance threshold value;
a host performance window value;
a host prediction horizon value;
a notification type; and
a reporting interval;

the storage device controller is further configured to:
determine, responsive to the data storage device being initialized and based on a plurality of storage operations from the host, the defined host access pattern; and
predict the increase in maintenance operations based on the defined host access pattern continuing through a performance window; and the maintenance operations for increasing storage availability include garbage collection of flash memory data blocks.

11. A computer-implemented method, comprising:

sending, from a host device, storage operations to a host interface of a data storage device according to a defined host access pattern and a storage performance requirement;

receiving, by the host device and from the data storage device, notification of a predicted change in a performance value; and displaying, to a user of the host device and through a user interface display of the host device, a warning notification indicating the predicted change in the performance value.

12. The computer-implemented method of claim 11, further comprising:

determining, by the host device, a performance threshold for the performance value;

sending, by the host device, the performance threshold to the data storage device; and determining, by the data storage device, that the predicted change in the performance value crosses the performance threshold, wherein receiving notification of the predicted change in the performance value is responsive to the data storage device determining that the predicted change in the performance value crosses the performance threshold.

13. The computer-implemented method of claim 11, further comprising:

sending, by the host device, a host performance window value;

determining, by the data storage device and based on the host performance window value, a performance window; and predicting, by the data storage device, an increase in maintenance operations over the performance window, wherein the predicted change in the performance value is based on the increase in maintenance operations.

14. The computer-implemented method of claim 11, further comprising:

sending, by the host device, a host prediction horizon value;

determining, by the data storage device and based on the host prediction horizon value, a prediction horizon; and predicting, by the data storage device, an increase in maintenance operations at a future time corresponding to the prediction horizon, wherein the predicted change in the performance value is based on the increase in maintenance operations.

15. The computer-implemented method of claim 11, further comprising:
    determining, by the host device, a plurality of severity thresholds; and
    determining, by the data storage device and based on the predicted change in the performance value, a severity value for the predicted change, wherein:
        receiving the notification of the predicted change in performance value includes the severity value for the predicted change; and
        the severity value for the predicted change corresponds to at least one severity threshold of the plurality of severity thresholds.

16. The computer-implemented method of claim 11, further comprising:
    determining, by the data storage device, a prediction probability value for the predicted change in the performance value, wherein receiving the notification of the predicted change in performance value includes the prediction probability value; and
    displaying, by the host device and through the user interface display of the host device, the prediction probability value for the predicted change.

17. The computer-implemented method of claim 11, further comprising:
    storing, by the data storage device, a notification value in a notification register of the host interface; and
    periodically checking, by the host device, the notification register, wherein receiving notification of the predicted change in the performance value is responsive to checking the notification register.

18. The computer-implemented method of claim 11, further comprising:
    storing, by the data storage device and responsive to the predicted change in the performance value, at least one performance change indicator value in an indicator memory location, wherein:
        the indicator memory location is in an interface function register in the host interface; and
        receiving notification of the predicted change in the performance value includes reading, by the host device, the at least one performance change indicator value from the indicator memory location.

19. The computer-implemented method of claim 11, further comprising:
    processing, by the data storage device, the storage operations from the host device;
    processing, by the data storage device, maintenance operations for increasing storage availability in a storage medium of the data storage device;
    determining, by the data storage device, the performance value for the storage operations;
    predicting, by the data storage device, an increase in maintenance operations;
    predicting, by the data storage device and based on the predicted increase in maintenance operations, the predicted change in the performance value; and
    notifying, by the data storage device and through the host interface, the host device of the predicted change in the performance value.

20. A host device, comprising:
    a host processor;
    a host memory;
    a storage interface configured to communicate with a host interface of a data storage device;
    a user interface display;
    means for sending storage operations to the host interface of the data storage device according to a defined host access pattern and a storage performance requirement;
    means for receiving, from the data storage device, notification of a predicted change in a performance value; and
    means for displaying, to a user of the host device and through the user interface display of the host device, a warning notification indicating the predicted change in the performance value.

* * * * *